(12) United States Patent
Harutyunyan

(10) Patent No.: US 10,166,529 B2
(45) Date of Patent: Jan. 1, 2019

(54) METHOD FOR PREPARATION OF VARIOUS CARBON ALLOTROPES BASED MAGNETIC ADSORBENTS WITH HIGH MAGNETIZATION

(71) Applicant: Honda Motor Co., Ltd., Tokyo (JP)

(72) Inventor: Avetik Harutyunyan, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 274 days.

(21) Appl. No.: 14/215,463

(22) Filed: Mar. 17, 2014

(65) Prior Publication Data

US 2014/0264144 A1    Sep. 18, 2014

Related U.S. Application Data

(60) Provisional application No. 61/793,408, filed on Mar. 15, 2013.

(51) Int. Cl.

| | | |
|---|---|---|
| *B01J 20/32* | (2006.01) | |
| *B01J 20/28* | (2006.01) | |
| *C10M 103/02* | (2006.01) | |
| *B01J 20/20* | (2006.01) | |
| *B01J 20/30* | (2006.01) | |
| *H01F 1/00* | (2006.01) | |
| *B82Y 25/00* | (2011.01) | |
| *B82Y 40/00* | (2011.01) | |

(52) U.S. Cl.
CPC ........ *B01J 20/3293* (2013.01); *B01J 20/20* (2013.01); *B01J 20/205* (2013.01); *B01J 20/28009* (2013.01); *B01J 20/3078* (2013.01); *B01J 20/3204* (2013.01); *B01J 20/324* (2013.01); *B01J 20/3289* (2013.01); *B01J 20/3295* (2013.01); *H01F 1/0054* (2013.01); *B82Y 25/00* (2013.01); *B82Y 40/00* (2013.01); *H01F 1/0063* (2013.01)

(58) Field of Classification Search
CPC ............ C01B 31/0446; C01B 31/0423; C01B 31/043; C01B 31/0438; C01B 31/00; B01J 20/3028; B01J 20/3293; B01J 20/28009; C10M 103/02; C10M 25/02
USPC ....... 427/122, 229, 565, 600, 127, 128, 129, 427/130, 131, 132, 560; 428/842.6, 428/32.73, 40.2
See application file for complete search history.

(56) References Cited

U.S. PATENT DOCUMENTS

| | | |
|---|---|---|
| 3,803,033 A | 4/1974 | Sutherland |
| 4,201,831 A | 5/1980 | Slusarczuk et al. |

(Continued)

FOREIGN PATENT DOCUMENTS

| | | |
|---|---|---|
| CN | 102074687 A | 5/2011 |
| EP | 0451299 B1 | 4/1995 |

(Continued)

OTHER PUBLICATIONS

Sara E. Skrabalak, Phys. Chem. Chem. Phys., 2009, 11, 4930-4942.*
Andrews, R. et al., "Continuous production of aligned carbon nanotubes: a step closer to commercial realization," Chemical Physics Letters, Apr. 16, 1999, pp. 467-474, vol. 303, Elsevier Science BV, Netherlands.

(Continued)

*Primary Examiner* — Tabassom Tadayyon Eslami
(74) *Attorney, Agent, or Firm* — Arent Fox LLP

(57) ABSTRACT

A process for the production of coating graphene, and other carbon allotropes, onto carbon-coated magnetic nanoparticles while maintaining high magnetic moment and adsorption properties is disclosed.

12 Claims, 3 Drawing Sheets

Step 1. Growth of Carbon Coated Fe Particles

Metal organic precursor: ferrocene

Fe(C₅H₅)₂

Fe(C₅H₅)₂ →

Carbon coated Fe particles

(56) References Cited

U.S. PATENT DOCUMENTS

| | | | |
|---|---|---|---|
| 5,456,986 A * | 10/1995 | Majetich | B22F 1/0018 148/105 |
| 5,593,740 A | 1/1997 | Strumban et al. | |
| 8,097,185 B2 | 1/2012 | Miller et al. | |
| 2005/0116195 A1 | 6/2005 | Tsang et al. | |
| 2008/0160416 A1* | 7/2008 | Chen | H01M 4/362 429/231.8 |
| 2009/0183650 A1 | 7/2009 | Doeff et al. | |
| 2010/0059449 A1 | 3/2010 | Grass et al. | |
| 2010/0307983 A1 | 12/2010 | Viswanathan | |
| 2012/0145623 A1* | 6/2012 | Linford | B01J 20/28004 210/263 |
| 2012/0288958 A1 | 11/2012 | Thompson | |
| 2012/0329640 A1 | 12/2012 | Bosnyak et al. | |
| 2013/0081335 A1* | 4/2013 | Mazyar | C01B 31/06 51/309 |

FOREIGN PATENT DOCUMENTS

| | | |
|---|---|---|
| EP | 1342502 A1 | 9/2003 |
| SU | 507524 | 3/1976 |
| WO | 9106322 A | 5/1991 |
| WO | 2005071136 A2 | 8/2005 |
| WO | 2011086354 A2 | 7/2011 |

OTHER PUBLICATIONS

Hashim, D. P., et al., "Covalently bonded three-dimensional carbon nanotube solids via boron induced nanojunctions," Scientific Reports, Apr. 13, 2012, vol. 2, No. 363, DOI:10.1038/srep00363.

Lu, An-Hui, et al., "Highly stable carbon-protected cobalt nanoparticles and graphite shells," Chem. Communications, Nov. 17, 2004, pp. 98-100, The Royal Society of Chemistry, United Kingdom.

Mohapatra, M., et al., "Synthesis and applications of nanostructured iron oxides/hydroxides—a review," Intnl. J.Eng.Science and Technology, 2010, pp. 127-146, vol. 2, No. 8, Multicraft Limited.

Romanchuk, A. Y., et al., "Graphene oxide for effective radionuclide removal," Phys. Chem. Chem. Phys., Dec. 20, 2012, The Owner Societies.

Yang, X., et al., "Superparamagnetic graphene oxide-Fe3O4 nanoparticles hybrid for controlled targeted drug carriers," J. Mater. Chem., Mar. 5, 2009, pp. 2710-2714, vol. 19, The Royal Society of Chemistry, United Kingdom.

Oliveira, L. C.A., et al., "Activated carbon/iron oxide magnetic composites for adsorption of contaminants in water," Carbon, 2002, pp. 2177-2183, vol. 40, Elsevier Science Ltd., Netherlands.

International Search Report of PCT/US2014/030383 (corresponding PCT application) dated Aug. 12, 2014 by European Patent Office (4 pages).

\* cited by examiner

Step 3. Mixing of Graphite Oxide
Flakes and Carbon Coated Fe particles

Graphene flakes + Carbon coated Fe particles

Step 2.
Sonication of Carbon Coated Fe particles

Carbon coated Fe particles

METHOD FOR PREPARATION OF VARIOUS CARBON ALLOTROPES BASED MAGNETIC ADSORBENTS WITH HIGH MAGNETIZATION

RELATED APPLICATIONS

The present application claims benefit from earlier filed U.S. Provisional Application No. 61/793,408, filed Mar. 15, 2013, which is incorporated by reference in its entirety for all purposes.

BACKGROUND

Field of the Invention

The present teachings are directed to methods of producing a carbon coated particle with both high magnetic moment and high adsorption capacity.

Discussion of the Related Art

There are a number of reports on the use of carbon-based magnetic adsorbents. Various carbon allotropes can be attached to magnetic particles to provide high capacity, and high surface areas adsorbents, and combined with magnetic particles allows for magnetic guided delivery of drugs or removal of various pollutions, such as oil, heavy metals, radionuclides, etc., upon adsorption. However, one of the common drawbacks of these materials is the relatively weak saturation magnetism, which is vital for removal of adsorbed pollutions or for controlled drug delivery in an organism. Additionally, many of the known adsorbents are very small, typically less than 40 μm, which can in some instances make removal of the particles difficult.

In US 2010/0059449 A1, Grass et al. describe nanoparticles having a core shell type structure with a metallic core but with "soft" magnetic properties.

Tsang et al. in US 2005/0116195 A1 describe forming microparticles with a ferromagnetic core encapsulated in a graphitic shell containing hetero atoms. The hetero atoms can be catalytically active metals on the external surface for liquid phase reactions. Their process is described as having a pyrolysis temperature that must be sufficient to form the core and the graphitic coating at the same time.

Miller et al. teaches a method of mixing an iron magnetic precursor with a carbon precursor which is then pyrolyzed at high temperatures to form activated carbon particles with the magnetic material dispersed throughout the structure. See U.S. Pat. No. 8,097,185 B2.

The magnetic saturation of bulk iron is about 220 emu/g which can provide a strong interaction between an iron particle and an external magnetic field. However, for adsorbent properties, the surface area of bulk iron is quite low, usually less than 10 m²/g. Furthermore, iron tends to oxidize easily to the ferric and ferrous states which have magnetic saturation values of about one-third the value of bulk iron.

There is a need for a method of preparing carbon allotrope-based magnetic adsorbents with high levels of both magnetic moments and adsorption.

SUMMARY

The present teachings are directed to a method of producing carbon allotrope-coated magnetic particles by providing a magnetic metal-containing precursor and heating the magnetic metal-containing precursor to form carbon-coated magnetic particles. These carbon-coated magnetic particles can optionally be treated with sonic energy, and then contacted with carbon allotropes to obtain carbon allotrope-coated carbon-coated magnetic particles.

Also disclosed by the present application is a method for producing carbon allotrope-coated ferromagnetic particles by providing an iron-containing precursor, heating the iron-containing precursor to form carbon-coated iron magnetic particles, and isolating the carbon-coated iron magnetic particles. Then treating the carbon-coated iron magnetic particles with sonic energy, contacting the carbon-coated iron magnetic particles with carbon allotropes, and thereby obtaining carbon allotrope-coated carbon-coated iron magnetic particles.

Further taught by this disclosure is a magnetic adsorbent composition made of ferromagnetic particles and a coating of a carbon allotrope surrounding the ferromagnetic particles. The composition is substantially free of iron oxides, and has magnetization of at least 40 emu/g.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

Figure 1:
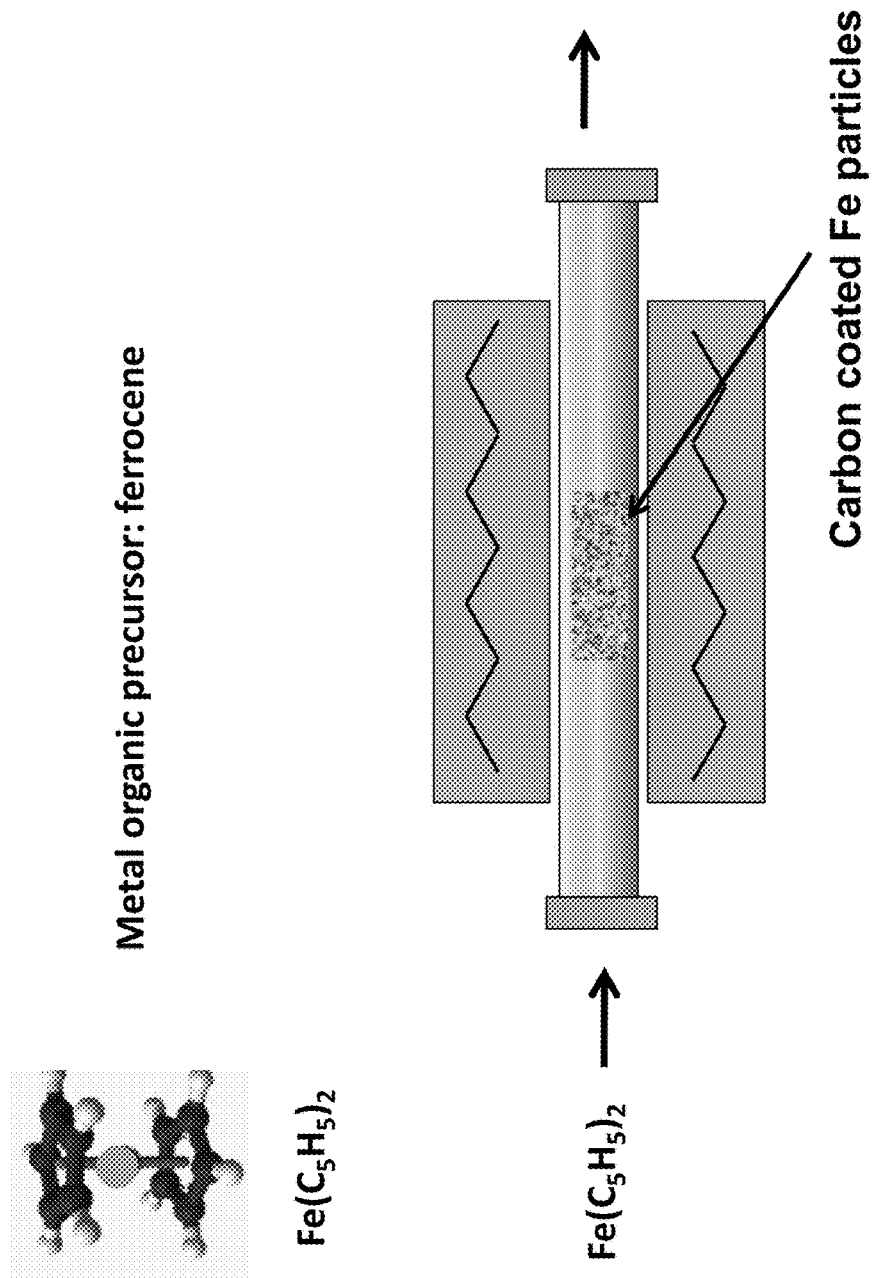
FIG. 1 is an illustration of the first step of the presently disclosed process for producing magnetic adsorbents.

According to the present disclosure, a method for producing carbon allotrope-coated magnetic particles can be achieved by providing a magnetic metal-containing precursor and then heating the magnetic metal-containing precursor to form carbon-coated magnetic particles. The resulting the carbon-coated magnetic particles can be, optionally, treated with sonic energy. This sonication treatment is used to de-agglomerate the particles so that a well dispersed mixture is obtained for the next step of the process.

The next step in the process is to contact the carbon-coated magnetic particles with carbon allotropes to coat or adhere the carbon allotropes to the carbon-coated magnetic particles. This step allows one to obtain carbon allotrope-coated carbon-coated magnetic particles.

The present method can further include isolating the carbon-coated magnetic particles after heating, or prior to the optional step of sonication treatment.

In one possible embodiment of the present method, the magnetic metal can be iron. Additionally, the magnetic metal-containing precursor can be ferrocene.

Various other metals can also be used as the magnetic metal in the present method including one or more metal selected from the group consisting of iron, cobalt, nickel, gadolinium, neodymium, and samarium. Some of these metals may be used alone or in alloys with other non-magnetic metals and non-metals. For instance, alloys such as ferrite, alnico, and rare-earth magnetic alloys like Sm—Co and Nd—Fe—B may also be used in the present method.

Various carbon allotropes can be utilized in the present method including any one of the group consisting of graphene, graphene oxide, graphite, graphite oxide, carbon fiber, activated carbon and carbon nanotubes. In one preferred method, graphene is used.

The present method can produce carbon allotrope-coated carbon-coated magnetic particles having a particle size ranging from 40 to 500 nm, and is some cases from 20 to 100 nm, and also the method can produce carbon allotrope-coated carbon-coated magnetic particles having magnetization of at least 40 emu/g.

In the present method, the carbon allotrope-coated carbon-coated magnetic particles produced are substantially free of iron oxides and iron carbides.

Another embodiment of the present teachings is a method for producing carbon allotrope-coated ferromagnetic particles by providing an iron-containing precursor for a subsequent step of heating the iron-containing precursor to form carbon-coated iron magnetic particles. These carbon-coated iron magnetic particles are then isolated, and treated with sonic energy. After sonication, the carbon-coated iron magnetic particles are contacted with carbon allotropes, and carbon allotrope-coated carbon-coated iron magnetic particles are obtained.

A suitable iron-containing precursor for the present method is ferrocene. Suitable carbon allotropes include at least one member selected from graphene, graphene oxide, graphite, graphite oxide, carbon fiber, activated carbon and carbon nanotubes.

The carbon allotrope-coated carbon-coated iron magnetic particles produced by this embodiment of the disclosure can have a particle size ranging from 40 to 500 nm, and is some cases from 20 to 100 nm. The produced particles can also have magnetization ranging from 20 to 100 emu/g, and in some embodiments is at least 40 emu/g. In other instances, the magnetization can be at least 20 emu/g.

The method produces carbon allotrope-coated carbon-coated iron magnetic particles that in some instances are substantially free of iron oxides and iron carbides.

Also disclosed by this application is a magnetic adsorbent composition composed of ferromagnetic particles and a coating of a carbon allotrope surrounding the ferromagnetic particles, wherein the composition is substantially free of iron oxides and iron carbides, and has magnetization of at least 100 emu/g or at least 40 emu/g.

In some embodiments of this composition, the ferromagnetic particles comprise iron. In the same, or other embodiments, of the disclosed composition, the carbon allotrope can be selected from the group consisting of graphene, graphene oxide, graphite, graphite oxide, carbon fiber, activated carbon and carbon nanotubes. In one preferred embodiment, the carbon allotrope is graphene.

The composition can have a magnetization of at least 20 emu/g. In some cases, the composition can have a magnetization ranging from at least 40 emu/g, or at least 100 emu/g in some compositions.

One of skill in the art will recognize that various heating conditions, such as time, temperature and atmosphere will impact the properties of the carbon coated particles. Additionally, the present process can, in some instances, not include the sonication step should the nanoparticles produced in the first step not require such a step. The exposure to sonic energy disrupts any cohesive forces between the individual carbon-coated magnetic particles, and is believed to make them more reactive for the subsequent step of the presently disclosed method. Also, the carbon allotrope used in the presently disclosed method includes allotropes other than graphene. It should be noted that the compositions and temperatures provided in the Figures are exemplary in nature and not limiting to the present disclosure.

The present method involves formation of carbon coated magnetic iron particles by thermal decomposition of an iron metal organic precursor eventually followed by dispersion in graphene flakes. The resulting particles according to the present disclosure can have an average particle size greater than about 40 μm. In some embodiments of the present method, the average particle size can range from 40 to 500 nm, depending on the reaction conditions and the selected metal precursor and carbon allotrope.

The two step approach of the present method can help to preserve the high magnetic moment of the initially formed carbon-coated magnetic particle. Additionally, by adjusting the time and temperature of the first step of decomposition of the organometallic precursor, such as ferrocene, the properties of the initially formed carbon-coated magnetic particle can be varied. Further variation of properties should be achievable by changing the metal-containing precursor by various substituents added to the metal complex. In order to vary the particle sizes of the synthesized particles, the concentration of ferrocene in the xylene solution has been varied from 3.0 wt. % to produce smaller particles up to 20.0 wt. % to produce larger particles. Additionally, the temperature of the tube furnace, or other suitable apparatus, used to thermally decompose the metal precursor can be adjusted to a range of 500 to 750 C.

The cohesiveness of the carbon allotrope-based adsorbent component, like graphene, graphite, etc. to the initially formed carbon-coated magnetic particle can be influenced by the interaction between the initially formed carbon-coated magnetic particle and the carbon allotrope-based adsorbent component. The presently disclosed method allows for flexibility in the selection of both the initially formed carbon-coated magnetic particle and the carbon allotrope-based adsorbent component since they are independently produced and do not interact until they are contacted with one another.

The adsorbent materials prepared according to the various embodiments of the presently disclosed methods can have magnetization properties ranging from 20 emu/g up to 140 emu/g, along with surface areas, dependent on the type of carbon allotrope utilized in the preparation, ranging from 200 $m^2$/g up to nearly 1000 $m^2$/g.

EXAMPLE

For the present Examples, magnetic particles were synthesized in a tube type furnace with quartz reactor at ambient pressure utilizing ferrocene and xylene as the Fe cluster and carbon coverage source, respectively.

Ferrocene at various concentration ratios was dissolved in xylene through mild sonication. The mixture was then loaded into a syringe and delivered into a quartz tube reactor through a capillary tube connected to a syringe pump. The reactor was heated to the synthesis temperature (450-700 C) under a constant flow of Ar (500 sccm) and hydrogen 40 (sccm). After the reactor reached the target temperature, the ferrocene/xylene mixture was injected continuously into the reactor at a rate of 3 mL/hr for 0.5-5 minutes.

For the preparation of the particles with various diameters, the following parameters were used: ferrocene (wt %) in xylene mixture: 5 wt % for P1 sample, 7 wt % for P2, 10 wt % for P3, 12 wt % for P4 and 15 wt % for P5 for 1 minute at temperature of 600 C. At the end of synthesis the furnace was turned off and cooled down to room temperature under $Ar/H_2$ flow.

Figure 3:
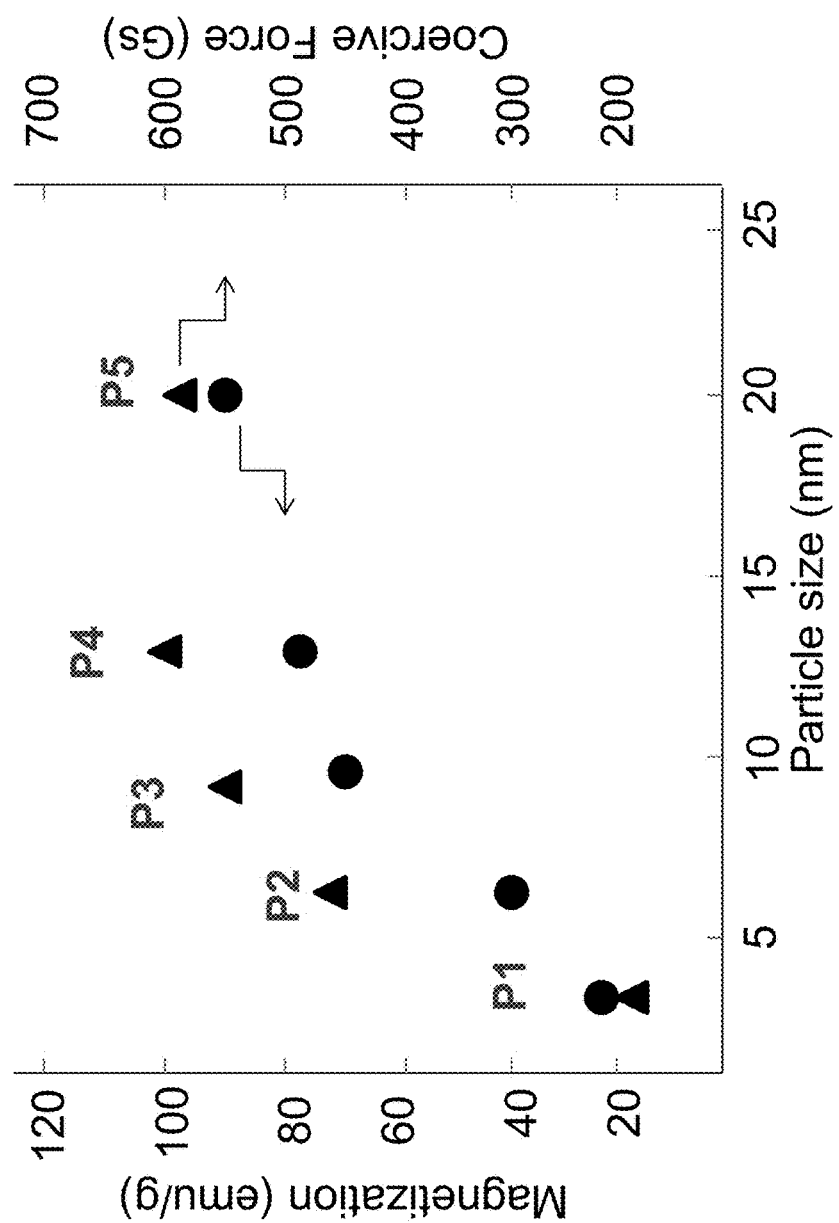
FIG. 3 is a plot of magnetization and coercive force versus particle size for carbon-coated iron particles according to the present disclosure.

The carbon-coated iron particles can then be collected from the furnace, and the magnetic properties of the particles were tested. Magnetic measurements were performed on superconducting-quantum-interface-device (SQUID) magnetometer (MPMS, Quantum Design) with magnetic fields up to 55 kG (kiloGauss) at room temperature. The coercive force in gauss and the magnetization in emu/g are presented in FIG. 3.

Figure 2B:
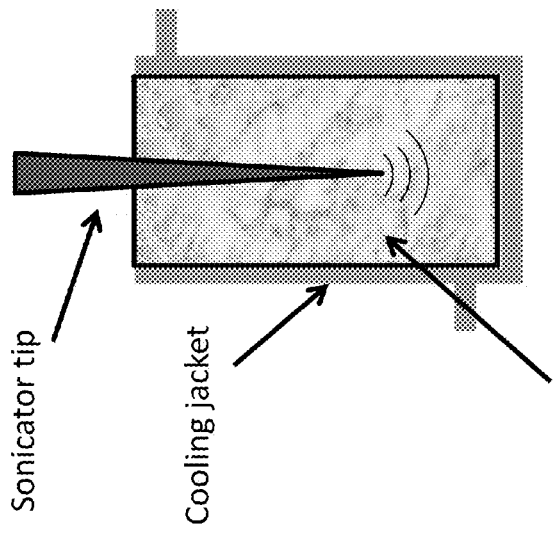
FIG. 2B is an illustration of reacting the carbon coated metal particles with a carbon allotrope for producing magnetic adsorbents according to the present disclosure.
Figure 2A:
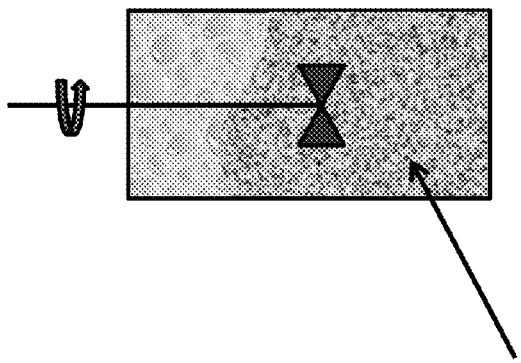
FIG. 2A is an illustration of the sonication of the carbon coated metal particles.

The carbon-coated material can then be placed in a sonication reactor as illustrated in FIG. 2A, 100% ethanol can be added, and the mixture sonicated. The solution can then be filtered and dried under vacuum at room temperature to remove the ethanol.

Graphene oxide previously prepared can be added to a reactor equipped with a stirring mechanism as illustrated in FIG. 2B. The dried, sonicated carbon-coated iron particles can be added to the reactor and the mixture stirred. The graphene-coated carbon-coated iron particles can show a magnetic field strength ranging from 40 to 100 emu/g, and can have surface areas ranging from 200 $m^2$/g to 1000 $m^2$/g.

All publications, articles, papers, patents, patent applications, and other references cited herein are hereby incorporated by reference herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What I claim is:

1. A method for producing carbon allotrope-coated magnetic particles comprising:
   providing a magnetic metal-containing precursor;
   heating the magnetic metal-containing precursor in a furnace to form a plurality of individual carbon-coated magnetic particles;
   collecting the plurality of individual carbon-coated magnetic particles from the furnace;
   treating the plurality of individual carbon-coated magnetic particles with sonic energy in a sonication reactor to de-agglomerate the plurality of individual carbon-coated magnetic particles; and
   after the treating of the plurality of individual carbon-coated magnetic particles with the sonic energy, removing the carbon-coated magnetic particles from the sonication reactor, and then contacting each of the plurality of individual carbon-coated magnetic particles with carbon allotropes in a vessel,
   for a time sufficient so as to obtain a plurality of individual carbon allotrope-coated carbon-coated magnetic particles having a magnetization from 20 emu/g to 140 emu/g and surface area from 200 $m^2$/g to 1000 $m^2$/g,
   wherein the carbon allotropes are selected from the group consisting of graphene, graphene oxide, graphite, graphite oxide, carbon fiber, activated carbon, and carbon nanotubes, and
   wherein the plurality of individual carbon-coated magnetic particles and the carbon allotropes are independent from each other and do not interact with each other until they are contacted with one another.

2. The method according to claim 1, wherein the magnetic metal comprises one or more metal selected from the group consisting of iron, cobalt, nickel, gadolinium, neodymium, and samarium.

3. The method according to claim 1, wherein the magnetic metal comprises iron.

4. The method according to claim 1, wherein the magnetic metal-containing precursor comprises ferrocene.

5. The method according to claim 1, wherein the plurality of individual carbon allotrope-coated carbon-coated magnetic particles comprises particles having a particle size ranging from 20 nm to 100 nm.

6. The method according to claim 1, wherein the plurality of individual carbon allotrope-coated carbon-coated magnetic particles comprise particles having magnetization of at least 40 emu/g.

7. The method according to claim 1, wherein the plurality of individual carbon allotrope-coated carbon-coated magnetic particles are substantially free of iron oxides and iron carbides.

8. A method for producing carbon allotrope-coated ferromagnetic particles comprising:
   providing an iron-containing precursor;
   heating the iron-containing precursor in a furnace to form a plurality of individual carbon-coated iron magnetic particles;
   collecting the plurality of individual carbon-coated iron magnetic particles from the furnace:
   treating the plurality of individual carbon-coated iron magnetic particles with sonic energy in a sonication reactor to de-agglomerate the plurality of individual carbon-coated iron magnetic particles; and
   after the treating of the plurality of individual carbon-coated iron magnetic particles with the sonic energy, removing the carbon-coated magnetic particles from the sonication reactor, and
   then contacting the plurality of individual carbon-coated iron magnetic particles with carbon allotropes in a vessel,
   for a time sufficient so as to obtain a plurality of individual carbon allotrope-coated carbon-coated iron magnetic particles having a magnetization from 20 emu/g to 140 emu/g and surface area from 200 m2/g to 1000 m2/g,
   wherein the carbon allotropes are selected from the group consisting of graphene, graphene oxide, graphite, graphite oxide, carbon fiber, activated carbon, and carbon nanotubes, and
   wherein the plurality of individual carbon-coated iron magnetic particles and the carbon allotropes are independent from each other and do not interact with each other until they are contacted with one another.

9. The method according to claim 8, wherein the iron-containing precursor comprises ferrocene.

10. The method according to claim 8, wherein the plurality of individual carbon allotrope-coated carbon-coated magnetic particles comprises particles having a particle size ranging from 20 nm to 100 nm.

11. The method according to claim 8, wherein the plurality of individual carbon allotrope-coated carbon-coated iron magnetic particles comprise particles having magnetization of at least 40 emu/g.

12. The method according to claim 8, wherein the plurality of individual carbon allotrope-coated carbon-coated iron magnetic particles are substantially free of iron oxides and iron carbides.

\* \* \* \* \*